R. L. DEZENDORF.
COMBINED LIQUID SEPARATOR AND INDICATOR FOR GAS CONDUITS.
APPLICATION FILED MAY 15, 1908.
914,812.
Patented Mar. 9, 1909.
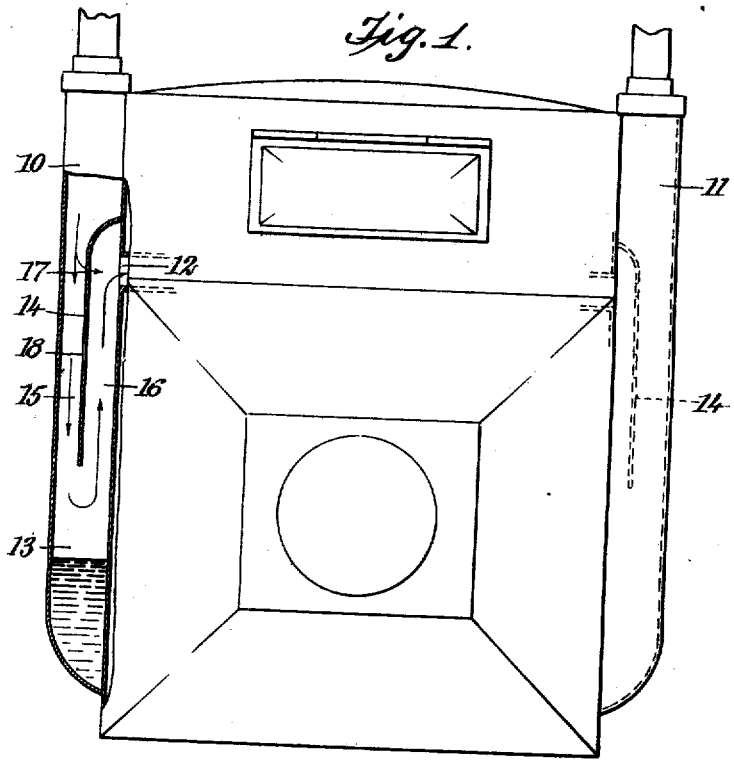
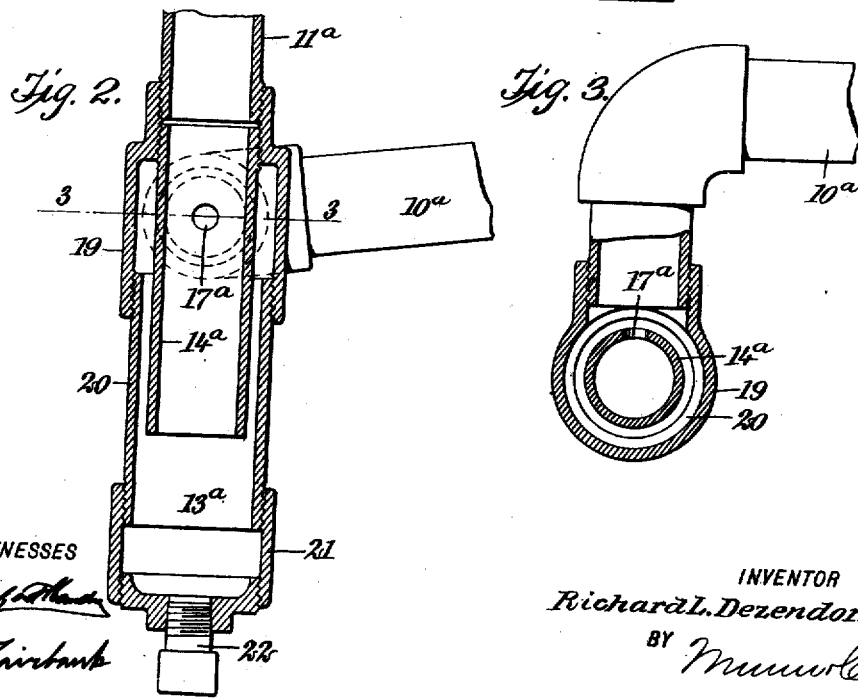
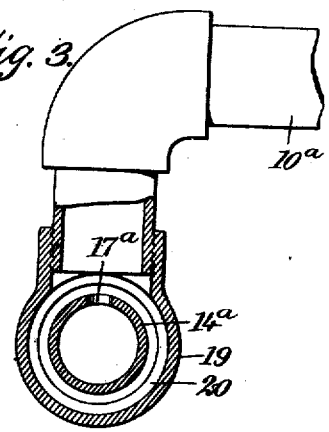
WITNESSES
INVENTOR
Richard L. Dezendorf
BY
ATTORNEYS

UNITED STATES PATENT OFFICE.

RICHARD L. DEZENDORF, OF NEW YORK, N. Y.

COMBINED LIQUID SEPARATOR AND INDICATOR FOR GAS-CONDUITS.

No. 914,812.

Specification of Letters Patent.

Patented March 9, 1909.

Application filed May 15, 1908. Serial No. 432,984.

*To all whom it may concern:*

Be it known that I, RICHARD L. DEZENDORF, a citizen of the United States, and resident of the city of New York, Richmond Hill, borough of Queens, in the county of Queens and State of New York, have invented a new and Improved Combined Liquid Separator and Indicator for Gas-Conduits, of which the following is a full, clear, and exact description.

This invention relates to certain improvements in means for separating liquids from gases and indicating when the liquid has collected to such an extent as to prevent the free passage of the gas.

The invention is particularly applicable for use in the delivery conduits for illuminating gas and may be utilized at any desired point along said delivery conduit.

My invention consists in providing a liquid collection pocket or chamber and so arranging the gas conduit that when a predetermined quantity of liquid has collected the flow of gas will not be completely stopped, but will be restricted to such an extent that the size of the gas flame will immediately indicate the reduction of the flow of gas and permit the liquid to be withdrawn before the supply of gas is entirely shut off by the accumulation of further liquid.

Reference is to be had to the accompanying drawings, forming a part of this specification, in which similar characters of reference indicate corresponding parts in all the views:

Figure 1 is a front view of a gas meter, having the inlet and outlet pipes constructed to embody my invention; Fig. 2 is a vertical section through a portion of the gas service pipe, constructed in accordance with my invention, and Fig. 3 is a transverse section on the line 3—3 of Fig. 2.

In gas meters it is customary to provide a gas inlet conduit 10 and a gas outlet conduit 11 upon opposite sides thereof and leading to the meter from above. The gas inlet conduit is substantially identical with the gas outlet and each connects with the interior of the meter through an aperture 12, adjacent the upper portion of said meter. Below the aperture each conduit extends downward to form a pocket, chamber or receiver 13, in which liquid may be collected below the aperture 12 without flowing through said aperture into the meter to interfere with the operation of the latter. Should a sufficient quantity of liquid collect in this pocket or receiver so that the level would rise to close the aperture 12, the flow of gas fluctuates with such violence as to sometimes extinguish the lights. In this specific form of meter, I contemplate the insertion of a partition 14 connected to the side of the gas conduit above the aperture 12 and extending downward to a point a considerable distance below said aperture. The gas in entering through the conduit 12 must pass beneath the lower edge of the partition and up on the opposite side thereof to reach the aperture 12. In flowing from the meter it must pass beneath the lower edge of the other partition before escaping through the outlet conduit. The partition serves to divide the lower portion of the conduit into two separate passages 15 and 16, the former leading downward on one side of the partition and the other leading upward on the other side of the partition, and the two passages communicating with each other through the liquid collection pocket or chamber at the lower end. Preferably the upward passage is of slightly greater size than the downward passage, so as to prevent the liquid from being forced up the outlet passage should it rise to the level of the lower edge of the partition. In the partition I provide an aperture 17 adjacent the aperture 12, but of considerably smaller size.

During the normal operation of the device a small portion of the gas will pass through the aperture 17, but the major portion will pass beneath the edge of the partition. Any liquid within the gas will collect in the pocket 13, and should this liquid collect to such an extent as to reach the level of the lower edge of the partition, the major portion of the flow of gas will be cut off, but the aperture 17 will permit a small quantity of gas to flow, and thus the lights which may be burning will not be completely extinguished. As soon as it is noticed that the flame at the several burners is greatly reduced in size, it will be known that the liquid should be pumped out or otherwise removed. If desired, a second aperture 18 may be provided in the partition, somewhat larger than the aperture 17, so that a second warning will be given when the liquid rises to close this aperture.

In utilizing my invention in connection with gas service pipes and independently of the meter, the partition is preferably annular in form and constitutes an inner pipe concentric with the walls of the liquid collecting pocket or chamber. In Figs. 2 and 3 I have shown an attachment adapted for use in gas service pipes, in which the gas supply conduit $10^a$ and the gas delivery conduit $11^a$ both communicate with the liquid collecting chamber $13^a$. The pipe $10^a$ is preferably secured to the side of a fitting 19, and at the lower end of the fitting extends the pipe 20, closed at its lower end by any suitable form of cap 21. The cap may, if desired, carry a plug 22, which may be removed to permit the draining of the liquid chamber. The fitting at its upper end connects with the pipe $11^a$, and a pipe $14^a$, constituting a partition, is secured in alinement with the pipe $11^a$ which extends into the pipe 20. The pipe $14^a$ is enough smaller than the pipe 20 so that its interior cross sectional area is slightly greater than the cross sectional area of the annular passage between the pipes. The pipe $14^a$, forming the partition is provided with an aperture $17^a$, adjacent the connections between the fitting and the pipe $10^a$. The gas entering through the pipe $10^a$ passes downward to the liquid collection chamber $13^a$ and up the pipe $14^a$. When the liquid rises to such a height in the lower end of the pipe $10^a$ that the gas cannot pass beneath the partition, it may still pass through the aperture $17^a$ but at a reduced rate, so that the difference in the volume of the flow of gas as indicated by the diminished size of the gas flame will show that it is necessary to withdraw the water from the chamber $13^a$ to allow the gas to resume its normal flow.

Having thus described my invention, I claim as new and desire to secure by Letters Patent:

In a conduit for delivering heating or illuminating gas, means for separating liquid from said gas and indicating the presence of a predetermined quantity of said liquid, comprising, in combination, a downwardly-extending gas passage adapted to be connected to a source of supply, an upwardly-extending gas passage adapted to deliver to a burner, a liquid-collecting chamber connecting said passages at their lower ends, and a small aperture or passage connecting said passages above their lower ends, the downwardly-extending passage, the liquid chamber, and the upwardly-extending passage constituting the main delivery passage for the gas and having a capacity to afford a supply sufficient to support a full or normal flame at the burner and the small aperture or passage constituting an auxiliary or safety passage and having a capacity to afford a supply sufficient only to support a flame reduced markedly below the normal when the collection of liquid within the liquid chamber closes communication between the upwardly and downwardly-extending passages.

In testimony whereof I have signed my name to this specification in the presence of two subscribing witnesses.

RICHARD L. DEZENDORF.

Witnesses:
EVERARD B. MARSHALL,
PHILIP D. ROLLHAUS.